3,101,295
PICKING AND GINNING AID
Frederick T. Lense, Mauldin, S.C., assignor to Esso Research and Engineering Company, a corporation of Delaware
No Drawing. Filed Sept. 5, 1961, Ser. No. 136,170
15 Claims. (Cl. 117—139.5)

This invention relates to novel fiber conditioners and to their use in mechanical field picking and ginning of cotton.

In particular, the invention relates to the use of branched chain $C_{13}$ to $C_{32}$, particularly $C_{16}$ to $C_{26}$, and preferably $C_{16}$ to $C_{20}$, monohydric alcohols which are liquid at room or field temperatures of above about 40° F., e.g. from about 40° F. to 115° F., as moistening aids, lubricants, and anti-static agents in the mechanical field picking and ginning of cotton.

One aspect of the invention concerns the use of these alcohols in the picking and ginning of cotton. Another aspect of the invention relates to the use of 25 to 75 wt. percent aqueous emulsions of these alcohols containing an emulsifying agent which does not impart substantial wettability to the emulsion for moistening, cleaning and lubricating field picker spindles, for cotton fiber conditioning in both field picking and ginning, and to reduce dust, fiber damage and static charges which are inherent in the ginning of untreated cotton fiber.

This is a continuation-in-part of S.N. 815,326, filed May 25, 1959, now abandoned.

In recent years mechanical pickers have accounted for an ever increasing percentage of cotton harvesting. Mechanical pickers, although greatly accelerating the picking process, have, in general, adversely affected the quality of the cotton so picked as compared to hand-picked cotton. Excessive trash content and tangled fibers from machine-picked cotton have created new problems in the gin and/or picker. Dust from dry weather picking, trash from insufficient defoliation and spindle build-up from plant juices and dry fiber have interfered with the smooth operation of mechanical pickers in the field. In the picker trash accumulates on the screens over the spindle housing. This has in the past caused a decrease and/or stoppage of air flow thereby necessitating stoppage of the picker to permit clearing of the screens.

Many effects ranging from better field layout and better defoliants to the breeding of new varieties of cotton have been employed to facilitate mechanical picking. Among these are the use of various agents for moistening picker spindles to increase picker efficiency by preventing a build-up of foreign matter such as plant juices on the spindle and to impart a necessary lubricity to the cotton fiber to insure a proper disengagement of fiber from the spindle and prevent excessive tangling and fiber damage.

There are several machines on the market that will pick cotton. Although there are certain differences in design, they operate basically in the same manner. As the machine is propelled through the field, the cotton boll is contacted by a rotating spindle of the picker. Mechanical pickers may be equipped for providing a moistening and/or lubricating fluid to the spindles. In the past, water has been used for this purpose. The means employed to make this application may be in the form of a perforated rubber pad or roller connected to a tank containing the moistening agent. The rotating spindle passes in contact with said pad or roller adsorbing a small amount of the treating fluid, contacts the cotton boll recovering the seed cotton therefrom, and proceeds to contact a disengaging means, termed a doffer, which removes the fiber from the spindle for storage and subsequent removal from the picker. The alcohols and emulsions of this invention offer many advantages over practices used in the past. The build-up of plant juices and other foreign matter on the spindle is greatly reduced or completely eliminated resulting in a much more efficient and trash free picking operation with less fiber tangle and/or spindle twist while the fiber is simultaneously afforded a necessary lubricity for subsequent processing. Water alone is unsatisfactory in several respects, in that it will not keep the spindles free of foreign matter and in that the limited lubricity it imparts is soon dissipated.

The alcohols and emulsions of the instant invention not only improve the picking process per se but unless deliberately removed remain with the fiber to afford lubricity in subsequent processing steps such as ginning. When their removal is desirable in subsequent processing such as dyeing operations, the alcoholic materials may be easily removed by simple washing techniques.

The field application of the alcohols of this invention has so far herein been described solely with respect to the most conventional technique of picker application. It is not intended that the use of these liquids in the cotton field be confined to any single technique of application. Other means of application connected directly with the picking operation involving sprays, etc. may be used to bring the cotton fiber into contact with the liquids. The scope of this invention also includes pre-picking application of the alcohol or emulsion to the cotton crop including ground and airplane spraying or any application technique which may be applied prior to the removal of the cotton fiber from the field.

In field picking, emulsions having low wetting characteristics are preferred especially if the cotton is to be further processed immediately. However, so far as the picking operation itself is concerned, emulsions of these alcohols may be effected with any nonionic, anionic or cationic emulsifying agent.

After cotton has been picked, the next principal step in its process is that of ginning. The alcohols or emulsions of this invention may first be applied at the gin to cotton that has not been field treated, where a mixture of treated and untreated cotton is to be ginned or where the field treatment is inadequate to provide the desired lubricity for ginning operations.

The term "ginning" in its most specific meaning refers to the process of separating the lint cotton from the seed, but usually is extended to cover other processes that are carried out at the place of seed removal and which are involved in turning out a gin bale such as cleaning, drying, baling, and so forth. The terms "lint" and "lint cotton" as used herein refer to cotton fiber after it has been removed from the seed by ginning. The term "seed cotton" as used herein refers to cotton that has not been ginned and which contains both fibers and seed. The term "gin" as used herein refers to any device, apparatus or machine used for the separation of cotton fibers from seed cotton.

The typical gin consists of a series of circular saws mounted on a horizontal revolving shaft. The teeth of the saws project through sets of steel ribs. The revolving saws engage the cotton fibers, pull them from the seed, and carry them through the ribs. The lint cotton is removed from the saws either by brushes or by air suction. The lint cotton is cleaned by additional mechanical and air treatments and is conveyed, usually by air, to the baling press where it is compressed into bales of about 500 pounds each. Equipment for cleaning the cotton at the gin may consist of conventional type spiked-drum, spider arm, paddle-wheel or tooth cylinders operating over some type of screen, concave bar grid, or other separation apparatus, and saw-cylinder cleaners and extractors or combinations of these various types.

As with ginning proper appropriate conditioning of the seed cotton is necessary to insure effective cleaning. Seed cotton that has a moisture content that is too high will not give up trash readily. On the other hand, overdrying by heating upstream from the gin saw results in brittle fiber and excessive loss in bale weight. Cotton harvested in dry weather in addition to that produced in arid regions often requires the addition of moisture to condition it for cleaning or ginning in such a way as to preserve the inherent fiber properties. See "Cleaning Cotton at Gins and Methods for Improvement," Circular No. 922, United States Department of Agriculture, July 1953.

Another problem of the ginning process directly associated with the moisture content of the cotton being processed is that of static electricity. This problem is especially troublesome in the arid cotton regions of the South Western United States. Static electricity, or "static" as it is generally called in the cotton ginning industry, is electricity that has been generated on, or transferred to, a material and remains there temporarily. When dry, dissimilar materials, such as cotton and galvanized sheet iron are rubbed together or contacted and then separated, the materials generally become charged with static electricity. When the amounts of static charge on the materials become sufficiently large, problems arise because of the forces of attraction and repulsion, the heat energy and the possible physiological shock resulting from static discharges. Frequently, enough static builds up on the cotton in a gin to cause it to adhere to machinery parts, resulting in chokage that reduces the gin output. In extreme cases static may cause the complete shut down of the gin.

A fiber coating that would materially reduce direct contact between the cotton fiber and the metal parts of the gin or cleaner, could reduce or eliminate the static problem. The lubricant in accordance with this invention should have low wetting characteristics since excessive wetting prevents proper removal of trash and results in undue tangling and clogging. The lubricant may be applied at any stage of the process at the gin as desired. If their advantages are to be utilized in the ginning process proper the emulsion or alcohol must, of course, be applied upstream from the gin saws, i.e. before the seed cotton reaches the gin saws. The alcohols or emulsions are preferably applied in the form of a fine spray. However, it is within the scope of this invention to make application of these liquids to the cotton fiber by any conventional means of applying a liquid to a solid whereby a relatively uniform distribution of the lubricant will result.

The preferred emulsions for use in the ginning processes including both ginning per se and the aforedescribed cleaning operations associated therewith and in the aforedescribed applications in the cotton field are relatively stable aqueous emulsions of the aforedescribed alcohols which may be formed by simple agitation with low concentrations of an emulsifier compound having an organic hydrophobic component and a polyalkylene oxide hydrophilic component wherein the weight relationship between such components is balanced in a manner that will not impart substantial wetting properties to the emulsifier.

It is known that higher molecular weight alcohols are not emulsifiable in or with water unless an emulsifying agent is added.

Providing the wetting properties of the emulsifier are sufficiently low, concentrations of emulsifier may be used in accordance with this invention up to as high as 10 wt. percent based on the weight of water in the emulsion. Obviously, however, much lower concentrations, e.g. 0.05 to 1.0, preferably below 0.2 wt. percent, are preferred, both with regard to cost and with regard to the aforementioned wetting properties. The preferred emulsions may be effected by simple agitation and remain stable for periods adaptable for diversified use, e.g. from 1 to 24 hours, and be reformed after de-emulsification in the same manner. Emulsions of the aforedescribed ingredients which will remain stable for much longer periods can be effected by homogenization, colloid milling and ultrasonic devices known to the art.

The alcohols or emulsions may be applied to cotton fibers in amounts up to about 10 wt. percent of the said fibers without wetting such fibers to a degree that will deleteriously affect the subsequent use of such fibers in conventional mechanical textile processing operations. For most purposes it will be found that about 0.2 to 10 wt. percent of the agent is satisfactory. Even very small amounts, e.g. 0.05 wt. percent of the fiber, have a noticeable effect. However, applications from about 0.5 to 2.0 wt. percent are preferred.

Suitable alcohols for use in this invention are preferably prepared by the Aldox process, a modification of the well-known Oxo process.

In the Aldox process, a primary alcohol product is prepared from an olefin and a synthesis gas of carbon monoxide and hydrogen. Except for the use of a reaction modifier hereinafter discussed, and the product, the Aldox process is substantially the same as the Oxo process. In the Oxo process, oxygenated organic compounds are synthesized in the presence of a cobalt catalyst from organic compounds containing olefinic linkages by reaction with carbon monoxide and hydrogen. In this reaction, predominantly aldehydes and minor proportions of ketones and alcohols are formed. The products from this Oxo step may then be hydrogenated in a second step to convert the organic carbonyl compounds containing one more carbon atom than the olefinic starting material to the corresponding alcohol. The hydrogenation catalyst may comprise any known reduction catalyst such as metallic supported or unsupported nickel, copper chromite, sulfactive catalyst such as oxides and sulfides of tungsten, nickel, molybdenum and the like.

Straight and branched chain olefins such as propylene, butylene, pentene, hexene, heptene, styrene, olefin polymers such as di and triisobutylene, hexene and heptene dimers, polypropylenes, olefinic fractions from the hydrocarbon synthesis process, thermal or catalytic cracking operations, and other sources of hydrocarbon fractions containing such olefins may be used as starting materials depending on the nature of the final product desired. The synthesis gas mixture fed to the first stage may be any desired ratio of $H_2$ to CO, preferably within the limit of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general, about 2500 to 25,000 cubic feet of $H_2+CO$ per barrel of olefin feed are employed.

The catalyst for the first stage of the process may be employed in the form of an oil-soluble compound of the catalytically active carbonylation metal. Thus, there have been employed the salts of the metals such as cobalt and a high molecular weight fatty acid such as stearic, oleic, naphthenic, linoleic and the like. Water-soluble catalyst, such as cobalt acetate, chloride, and the like, may also be used. Catalyst concentrations may vary from about 0.05 to 1.0% by weight of the catalyst calculated as cobalt on olefinic feed. The first stage for carbonylation reaction may be carried out at temperatures in the range of from about 250° to 450° F. depending upon the nature of the olefin and other reaction conditions. In general, the lower olefins will react at lower temperatures and will react to a greater extent than the higher molecular weight olefins.

The Oxo process without modification will produce some alcohols of higher molecular weight, but the yields of such products are relatively low. These alcohols result from several different mechanisms including aldolization, dehydration, dimerization, acetalization, etc. Some of these alcohols contain two more than twice the number of carbons in the olefin feed and are highly branched alkanols. Another type contains three more than twice the number of carbons in the olefin feed but this latter type also contains an additional oxygen atom in the molecule forming an ether linkage with two internal carbon atoms.

For a more detailed description of these ether alcohols see Oxo Ether Alcohols, Bartlett et al. Industrial and Engineering Chemistry, March 1959, pages 257–258.

In the Aldox process the same reactors, catalyst, and reaction conditions may be employed as in the aforedescribed Oxo process, and in addition, a reaction modifier is employed which results in the production, in high yields, of a primary alcohol product having $2n+2$ carbon atoms, where an olefin with $n$ carbon atoms is passed to the carbonylation zone. Accompanying this reaction is the normal aldehyde reaction producing aldehydes and alcohols having $n+1$ carbon atoms.

The aforesaid reaction modifiers are preferably zinc compounds. The zinc compounds suitable are salts or fatty acids, oxides, hydroxides, carbonates, and also metallic salts of cobalt hydrocarbonyl. Thus, in the Aldox process there is passed into the first-stage reaction zone along with the olefin carbon monoxide, hydrogen, and cobalt carbonylation catalyst, a reaction modifier, preferably zinc. Other Aldox modifiers have been suggested in the prior art.

The mono-ether, mono-hydroxy alcohols hereinbefore described may also be produced in the Aldox process in somewhat lesser quantities. The $C_{13}$ to $C_{32}$ alcohols of this group may also be used in this invention.

A liquid oxygenated reaction product comprising aldehydes from the carbonylation reaction containing inorganic contaminants, e.g. dissolved cobalt carbonyl and zinc salts, is sent to a catalyst decomposition or decobalting zone, where in the presence of heat and steam, water, or dilute organic acid, the inorganic contaminants are removed from the aldehyde product in a manner known in the art. This product, now substantially completely free of inorganic compounds, is hydrogenated under conventional conditions to alcohols and the alcohol product fractionated to produce both the $n+1$ and $2n+2$ alcohols, as described.

The production of such alcohols by the Aldox process is covered by U.S. Patent 2,811,567.

Monohydric, primary alcohols may also be prepared from aldehydes via conventional Aldol condensation. By this process the positive end of a carbonyl group is linked with a carbanion by a typical "aldol condensation" known to the art. The primary Aldol product may then be dehydrated by means known to the art to yield an unsaturated aldehyde which can be hydrogenated to a primary alcohol.

Another method for preparing monohydric, primary alcohols is by the process known to the art as the Guerbet reaction.

Particularly suitable emulsifiers for use with this invention are those having a hydrocarbon comprising hydrophobic group containing 20–60, preferably 20–36, carbon atoms and a polyalkylene oxide hydrophilic group which constitutes from 50–95, preferably 70–95 wt. percent of the emulsifier. In the emulsifiers of this type, the hydrocarbon comprising group may be an alkyl, aryl, or alkylaryl hydrocarbon or a substituted alkyl, aryl or alkylaryl hydrocarbon, e.g. ethers and alcohols. Many emulsifiers of this type are sold commercially and may be prepared by various methods well known to the art. A particularly good emulsifier for this purpose is marketed under the trade name of Igepal DM-880. The alkylene oxide units in the hydrophilic group may be either ethylene oxide or propylene oxide with the former preferred. Of these, the most preferred are dialkyl phenoxy polyoxyethylene ethanol type non-ionic emulsifiers wherein the alkyl substituents of the phenol nucleus contain at least 9 carbon atoms each and the ethylene oxide units comprise 75–95 wt. percent of the compound. With the most preferred type of emulsifier just described, the emulsions of this invention may be effected with emulsifier concentrations in the range of 0.05 to 0.2%, preferably 0.075 to 0.125%, based on the weight of water in the emulsion. Such emulsifiers have the added advantage that they may be used with the alcohols of this invention in much larger quantities, i.e. above 1%, if desired, without producing a noticeable increase in the wetting properties.

Another variation of this type of emulsifier which does not impart substantial wettability to the alcohols of this invention may also be prepared wherein the hydrophobic element is a polyoxyalkylene, e.g., polyoxypropylene, polymer prepared by the condensation of propylene oxide, or a higher alkylene oxide, e.g. butylene oxide, with an organic base compound containing at least one and preferably a plurality of reactive hydrogen atoms, e.g. propylene glycol, monofunctional alcohols such as butanol, secondary amines such as diethyl amine, etc., and the hydrophilic group is formed by condensing ethylene oxide with the aforesaid hydrophobic element.

Emulsifiers of this general type are discussed in detail in U.S. Patents 2,674,619 and 2,677,700, and elsewhere in the literature. See Soap and Sanitary Chemicals (1950), v. 26, No. 10, beginning at p. 40; The Journal of the American Oil Chemists Society (1951), v. 28, beginning at p. 294; and v. 29 (1952), of the same publication beginning at p. 240. These emulsifiers may be tailored to specific uses by controlling the hydrophobic-hydrophilic balance and the molecular weight of both the hydrophobic and hydrophilic groups.

Thus, the advantages to be gained by emulsifying water and higher molecular weight alcohols such as hereinbefore described with the emulsifiers described herein are at least twofold. First, an emulsifier is employed which adds little or nothing to the wetting properties of the alcohol and water per se and, second, stable emulsions can be effected with extremely low concentrations of the emulsifier thereby minimizing any potential increase in wetting properties. Neither water nor higher molecular weight alcohols such as those hereinbefore described will "wet out" cotton fibers under ordinary conditions of temperature and pressure when applied in the range of 0 to 10 wt. percent based on the weight of cotton fibers.

A convenient reference which may be used to characterize an emulsifier that will "impart substantial wettability" to these emulsions is provided by identifying the undesirable emulsifier as one that will reduce the wetting time of a $C_{20}$ branched chain, monohydric, primary alcohol-water emulsion below about 15 minutes as measured by Standard Test Method 17–1952 set forth in the 1958 Technical Manual of the American Association of Textile Chemists and Colorists at page 152 using standard test skeins of 2-ply cotton yarn, 0.1 wt. percent emulsifier based on weight of water, and a 25/75 water to alcohol weight ratio.

The term "branched chain, monohydric, primary alcohol" as used herein shall be construed to include both monohydric, primary alcohols which aside from the hydroxyl group are composed exclusively of carbon and hydrogen atoms and monhydric, primary alcohols which aside from the hydroxyl group are composed of carbon atoms, hydrogen atoms and a single oxygen atom forming an ether linkage with two of such carbon atoms.

*Example 1*

A branched chain $C_{16}$ monohydric alcohol wherein the carbinol group is positioned intermediate to the ends of the longest carbon chain was prepared by the Aldox process. This process and the range of operating conditions within which it may be carried out had previously been discussed herein. The alcohol of this example was prepared by this process employing as the olefin feed a $C_7$ olefin fraction previously prepared by a U.O.P. type polymerization of a $C_3$–$C_4$ olefin stream, cobalt and zinc catalyst in the form of their oil-soluble fatty acid salts, i.e. oleates, and under the following operating conditions.

Carbonylation reaction $C_7$
olefin feed rate_____ 510–530 B./D.[1]
Catalyst concentration_____ .08 wt. percent cobalt (on olefin), .02 wt. percent zinc (on olefin).
Temperature, °F_____ 350–360.
Pressure, p.s.i.g_____ 3000–3500.
Ratio of $H_2$ to Co in synthesis gas mixture_____ 1:1.4::1.

[1] Barrels per day.

The aldehyde comprising reaction product was subjected to a conventional decobalting treatment to remove inorganic contaminants. The decobalting was carried out at temperatures averaging about 270–380° F., pressures averaging about 155–165 p.s.i.g., in the presence of water employed in a water to feed ratio of about 0.1 to 1.

The aldehyde comprising product now substantially completely free of inorganic compounds was hydrogenated by conventional methods to alcohols, i.e. at an average temperature of about 470° F. and a pressure of about 3000–3500 p.s.i.g., and subsequently fractionated to separate the aforesaid $C_{16}$ alcohol.

A 25/75 wt. percent water/alcohol emulsion of the $C_{16}$ alcohol was prepared by conventional mechanical mixing using a commercially available nonionic emulsifying agent comprising a dinonyl phenol alkylene oxide condensate and containing about 85–90 wt. percent ethylene oxide per molecule. The concentration of emulsifying agent used was 0.1 wt. percent based on the weight of said water.

Approximately 1800 pounds of seed cotton were field picked using a two row mechanical field picker (John Deere).

The lubricant tank was filled with 10 gallons of the the emulsion prepared above. Approximately 3 gallons of the emulsion were used in the picking operation. A similar amount of cotton was picked without using a lubricant, and using water alone as the lubricant. The following observations were made with regard to these picking operations.

(1) Less spindle twist occurred with the emulsion than when picking without a lubricant, or when water alone was used.

(2) Cleaner spindles resulted when using the emulsion as demonstrated by a significant decrease of fiber and foreign matter on the spindles.

(3) Less trash accumulated in the spindle housings when using the emulsion, thus permitting the picker operator to make fewer stops to clean the spindle housings.

*Example II*

Cotton was field picked with a $C_{16}$ branched chain, primary alcohol prepared in accordance with the process described in Example I, and observations similar to those set forth in the aforementioned example were made.

*Example III*

One portion of seed cotton was sprayed with the emulsion of Example I and another portion was sprayed with a commercial hydrocarbon ginning lubricant. Equal amounts of about 1 wt. percent treating solution on weight of cotton was employed in each case.

Untreated cotton and the two treated cottons were ginned separately in a commercial gin and the following observations were made.

When the emulsion treated cotton was ginned, there was no plugging of the feed outlet to the gin and no other problems of static electricity occurred. The lint cotton from the emulsion treated seed cotton had a better overall appearance with better luster than the untreated cotton and that treated with the hydrocarbon lubricant. Less trash was found in the lint from emulsion treated cotton as compared to the untreated cotton and that treated with the hydrocarbon lubricant. The nep count was markedly reduced in the emulsion treated cotton as compared with the untreated cotton and that treated with the hydrocarbon lubricant. Also a lower percentage of short fibers were observed in the emulsion treated cotton.

*Example IV*

Cotton treated with 1 wt. percent of a $C_{16}$ branched chain primary, monohydric alcohol prepared in accordance with the process described in Example I was ginned in a commercial gin. Results substantially the same as those obtained in the previous example were gotten.

*Example V*

An emulsion identical to that of Example I was prepared except for the emulsifying agent. A high wetting nonionic emulsifier was employed in a 0.1 wt. percent concentration based on the water in emulsion. Seed cotton was sprayed with this emulsion in the amount of 0.5 wt. percent based on the weight of cotton. Another portion of cotton was treated in a 1 wt. percent application of the same hydrocarbon lubricant used in Example III. The two groups of cotton were ginned as in Example III. The cotton treated with the alcohol emulsion containing the high wetting emulsifier was not as nep free or of as good overall appearance as that treated with the low wetting alcohol emulsion of Example III. However, this emulsion treated cotton was equal in quality to the hydrocarbon treated cotton although employed at half the amount of the hydrocarbon lubricant.

*Example VI*

Cotton is ginned as in Example III using an emulsion prepared as in Example I except that a $C_{20}$ branched chain, monohydric, primary alcohol is used. The alcohol was prepared by the above-described Aldox process using a $C_9$ (U.O.P.) olefin fraction.

*Example VII*

A 75/25 water/alcohol emulsion, prepared as in Example I employing a $C_{26}$ branched chain, monohydric, primary alcohol, is used in the ginning of cotton as described in Example III.

*Example VIII*

Cotton is ginned as in Example III using a $C_{20}$ branched chain, monohydric, primary alcohol prepared by the Aldox process from $C_9$ (U.O.P.) olefin.

What is claimed is:

1. The method in the conditioning of raw cotton fibers, which comprises subjecting the seed cotton fibers, prior to ginning, to a uniform application of 0.05 to 10 wt. percent, based on the weight of the raw cotton fibers, of a $C_{13}$ to $C_{32}$, branched chain, monohydric, primary alcohol, wherein said alcohol is a liquid at all temperatures between 40° and 115° F.

2. The method of claim 1 wherein the alcohol is applied in the form of an emulsion, the emulsifying agent being one that does not impart substantial wettability to said emulsion.

3. The method of claim 1 wherein said alcohol is a $C_{16}$–$C_{20}$ alcohol.

4. The method of conditioning raw cotton fibers which comprises subjecting the seed cotton fibers, prior to ginning, to a uniform application of 0.2 to 10 wt. percent, based on the weight of raw cotton fibers, $C_{16}$ to $C_{20}$ branched chain, monohydric alcohol wherein said alcohol is a liquid at all temperatures between 40° and 115° F.

5. The method in the conditioning of raw cotton fibers, which comprises subjecting the seed cotton fibers, prior to their removal from the cotton plant, to a uniform application of 0.2 to 10 wt. percent, based on the weight of the raw cotton fibers, of a $C_{16}$ to $C_{20}$ branched chain, monohydric, primary alcohol, wherein said alcohol is a liquid at temperatures between 40° and 115° F.

6. The method in the conditioning of raw cotton fibers, which comprises subjecting the seed cotton fibers, prior to ginning, to a uniform application of 0.2 to 10 weight percent, based on the weight of the raw cotton fibers, of an emulsion comprising 25 to 75 weight percent of a $C_{13}$ to $C_{32}$, branched chain, monohydric, primary alcohol, 25 to 75 weight percent water and 0.05 to 10 weight percent, based on the weight of said water, of an emulsifying agent which does not impart substantial wettability to said emulsion, wherein said alcohol is a liquid at 40° F.

7. The method in the conditioning of raw cotton fibers which comprises subjecting the seed cotton fibers, prior to ginning, to a uniform application of 0.2 to 10 weight percent, based on the weight of the raw cotton fibers, of an emulsion comprising 25 to 75 weight percent of a $C_{13}$ to $C_{32}$, branched chain, monohydric, primary alcohol, 25 to 75 weight percent water and 0.05 to 10 weight percent, based on said water, of an emulsifying agent comprising an organic hydrophobic group containing 20 to 60 carbon atoms per molecule and an alkylene oxide hydrophilic group which comprises 50 to 95 weight percent of said molecule, wherein said alcohol is a liquid at 40° F.

8. The method of claim 7 wherein said alcohol is a $C_{16}$–$C_{20}$ alcohol.

9. The method of claim 7 wherein said hydrophilic group comprises 70 to 90 weight percent of said molecule.

10. The method of claim 7 wherein said emulsion contains 0.05 to 1.0 weight percent of said emulsifying agent based on the weight of said water.

11. The method of claim 7 wherein said hydrophobic group contains 20 to 36 carbon atoms.

12. The method of claim 7 wherein said emulsion is applied in the amount of 0.5 to 2 weight percent based on the weight of said raw cotton.

13. The method of conditioning raw cotton fibers which comprises subjecting the seed cotton fibers, prior to ginning, to a uniform application of 0.2 to 10 weight percent, based on the weight of raw cotton fibers, of an emulsion comprising 25 to 75 weight percent of a $C_{13}$ to $C_{32}$ branched chain, monohydric alcohol containing 25 to 75 weight percent water and 0.05 to 10 weight percent, based on said water, of an emulsifying agent containing a hydrophobic group containing 24 to 36 carbon atoms wherein each alkyl substituent contains at least 9 carbon atoms and a polyalkylene oxide hydrophilic group comprising 70 to 95 weight percent of said agent, wherein said alcohol is a liquid at all temperatures between 40° and 115° F.

14. The method of claim 13 wherein said emulsion contains 0.075 to 0.125 weight percent of said emulsifying agent.

15. The method in the conditioning of raw cotton fibers, which comprises subjecting the seed cotton fibers, prior to their removal from the cotton plant, to a uniform application of 0.2 to 10 weight percent, based on the weight of the raw cotton fibers, of an emulsion comprising 25 to 75 weight percent of a $C_{13}$ to $C_{32}$, branched chain, monohydric, primary alcohol, 25 to 75 weight percent water, and 0.05 to 10 weight percent, based on the weight of said water, of an emulsifying agent which does not impart substantial wettability to said emulsion, wherein said alcohol is a liquid at all temperatures between 40° and 115° F.

No references cited